Nov. 27, 1956

G. L. BIGGS 2,771,704

FISHHOOK GUARD

Filed July 9, 1954

INVENTOR.
GLENN L. BIGGS
BY
Richard von K. Bruns
Attorney

2,771,704

FISHHOOK GUARD

Glenn L. Biggs, Fayetteville, N. Y.

Application July 9, 1954, Serial No. 442,405

1 Claim. (Cl. 43—54.5)

This invention relates generally to protective devices for fishhooks, and has special reference to an improved fishhook guard which provides protection for both the fisherman and the hook and, because of its compact form and simplified construction, is particularly adapted for use in modern small tackle boxes or tackle carriers.

As is well-known among fishermen, if uncovered hooks, plugs and the like are placed together in a tackle box, they are quite apt to become entangled with one another and with other tackle. When this happens, it is usually a time consuming job to separate a particular hook or plug from the tangled mass, and during such undertaking the fingers and hands are likely to be pricked or torn by the sharp points on the hooks. In addition to these annoyances caused by the entanglement of the hooks, the contact of the hooks with one another and with the interior of the tackle box dulls the points and thus makes them less effective for catching fish.

Heretofore, it has been fairly common practice to insert the points of fishhooks in a sizeable piece of cork or similar material adapted to receive a large number of hooks. This practice prevents the hooks from becoming entangled with one another and also helps to keep their points sharp. However, the trend at present is toward smaller, more compact tackle boxes than have been used previously, and large cork blocks or the like are too bulky to fit conveniently into such equipment. Furthermore, it is desirable at times to provide individual protection for certain hooks, and the use of a conventional type of large block for but a single hook would be highly impractical.

The fishhook guard contemplated by the subject invention is sufficiently small so that a number of them can be carried at one time in a small tackle box or in the apparel of the fisherman without any inconvenience.

With the foregoing and other considerations in view, it is the primary object of this invention to provide an improved fishhook guard which, in addition to preventing entanglement of the hook with other hooks and protecting the point or points thereof, is small and compact and therefore adapted for use in small tackle boxes or the like.

Another important object of the invention is to provide an improved fishhook guard which can be quickly and easily engaged with and disengaged from a hook.

A further important object of the invention is to provide an improved fishhook guard which is very inexpensive to manufacture and yet is strong and durable.

A more specific object of the invention is to provide an improved fishhook guard which can be used within limits, for single or multiple pointed hooks of various sizes.

Another specific object of the invention is to provide an improved fishhook guard which can be used to protect unattached hooks or hooks attached to plugs, leaders and the like.

Other objects and advantages will become apparent from the following detailed description read in conjunction with the accompanying drawings wherein like reference numbers refer to similar parts in all the views.

Figure 1:
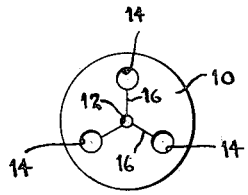
Figure 1 is a plan view of a fishhook guard embodying the invention.

Having reference now to the drawings, which illustrate a typical embodiment of the invention, the fishhook guard comprises a substantially flat member 10 of some penetrable, semi-resilient material such as a composition cork, rubber or the like. Member 10 is preferably disc shaped. The periphery of the member could, however, be other than circular without in any way changing the scope of the invention.

Member 10 is formed with a central hole 12 of relatively small diameter and a plurality of outer holes 14 of somewhat larger diameter, the outer holes being arranged in uniformly spaced relationship on a circular locus or path concentric with the central hole. As shown in the drawings, the member 10 is formed with three such outer holes although it is not intended that the invention be limited to this particular arrangement. Each of the outer holes 14 is connected with the central hole 12 by means of a slit or cut 16 through the member, for a purpose to be described hereinafter.

Figure 2:
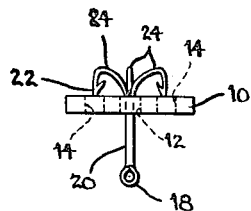
Figure 2 is a side elevation of the fishhook guard of Figure 1, showing a multiple pointed hook in engagement therewith.
Figure 3:
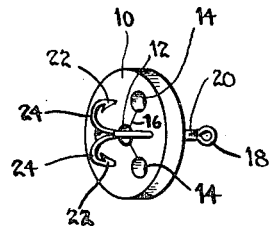
Figure 3 is a perspective view of the fishhook guard and multiple pointed hook shown in Figure. 2.

In operation, if the hook is unattached to a plug, leader or the like, it can be engaged with the guard in the following manner. The eye 18 and shank 20 of the hook are passed through the central hole 12 of the member 10, and the hook is rotated with the hole 12 serving as a bearing and a guide for the shank, until its prongs or points 22 can engage the member in the area between the outer holes 14 as shown in Figures 2 and 3. The points 22 are then firmly embedded in the penetrable material of the guard, and this holding action, plus the fact that the shank 20 extends through the small central hole 12, maintains the guard in position on the hook until it is desired to disengage the parts.

If the hook happens to be attached to a plug or leader, it will be engaged with the guard as follows. The curved portions 24 of the hook are positioned against one face of the member 10 with the shank 20 in alignment with the central hole 12 and the points 22 in alignment with the outer holes 14. The hook is then pushed through the member, the curved portions 24 thereof passing through the slits 16 which are provided for this purpose. When the hook has been pushed far enough through the member so that its points are clear of the other side, it is rotated until the points are moved out of alignment with the holes 14 and can be embedded in the intermediate, solid portions of the member as previously described. The parts may be disengaged by reversing the above procedure, i.e., the points of the hook are dislodged from the member and rotated until they are again in alignment with the holes 14; the hook is then pulled back through the member, emerging on the same side thereof at which it originally entered. In this manner, a plug or leader attached to the hook in no way hinders engagement of the hook with the guard and cannot become entangled therewith.

While the invention has been described in connection with a triple or three pronged hook and a guard having three outer holes 14, it will be apparent that the guard may be used equally well with a single pointed hook, or, the guard may be formed with two, four or more outer holes for multiple pronged hooks having two, four or more points. In every application of the guard, however, an important feature of the invention is the small central hole 12 which is only large enough to permit the eye 18 on the hook shank to pass therethrough. The hole 12 thus acts as a guide bearing to center the shank in the member 10 so that the points of the hook will always fall within the annular zone of the outer holes 14. This in turn enables the overall diameter of the member to be kept to a minimum since the clearance between the outer holes and peripheral edge need be no greater than the minimum necessary to satisfy strength requirements. On the other hand, if the central hole 12 were large, the shank of the hook could be positioned in the hole and still be far enough off center with respect to the disc member so that one or more of the hook points would fall outside the peripheral edge of the member, or else the clearance between the outer holes and peripheral edge would have to be much greater to prevent such an occurrence.

The outer holes 14 are larger than the central hole 12 so that the guard can accommodate hooks of various sizes. Thus, even though the size of the shanks and eyes of various hooks is substantially the same, the overall diameters of the hooks vary. Accordingly, the distance between the central hole and outer holes and the diameters of the latter are such that the guard may be used for many standard sizes of hooks.

From the foregoing description it will be apparent that the invention provides a novel and highly useful fishhook guard having a wide variety of applications and particularly adapted for use in small tackle boxes. The invention may be embodied in other specific forms without departing from the spirit or essential characteristics thereof. The embodiment disclosed is therefore to be considered in all respects as illustrative and not restrictive, the scope of the invention being indicated by the appended claim.

What I claim is:

A guard for use with a single gang type fishhook comprising a relatively small, flat circular member of penetrable material in which the points of the hook may be embedded, said member being formed with a small circular hole through the center thereof adapted to receive the shank of the fishhook when the points are embedded in the member, with a relatively close fit with the shank portion of said fishhook, said member being formed with a plurality of larger circular holes arranged in uniformly spaced relationship on a circular path concentric with said center hole, the points of the fishhook being normally embedded in said member in the portion thereof between adjacent pairs of said larger holes, said center hole acting as a bearing and a guide for the shank of the fishhook to prevent the points thereof from extending beyond the peripheral edge of the member and to locate them in the concentric path of said larger holes, said larger holes being sufficiently large to enable the points of gang hooks of various sizes to pass therethrough when the points are disengaged from the member and rotated into alignment with the holes, said member being formed with a radial slit extending between the center hole and each of the larger outer holes to enable the curved portions of the fishhook to pass completely through the member when withdrawing the hook from the guard.

References Cited in the file of this patent

UNITED STATES PATENTS

| | | |
|---|---|---|
| 1,850,039 | Townsend | Mar. 15, 1932 |
| 2,185,507 | Knapp | Jan. 2, 1940 |
| 2,204,185 | Lougheed | June 11, 1940 |
| 2,339,187 | Pain | Jan. 11, 1944 |
| 2,492,557 | Deimler | Dec. 27, 1949 |
| 2,600,314 | Miner | June 10, 1952 |
| 2,616,209 | Ploen | Nov. 4, 1952 |
| 2,685,756 | Mowbray | Aug. 10, 1954 |